UNITED STATES PATENT OFFICE.

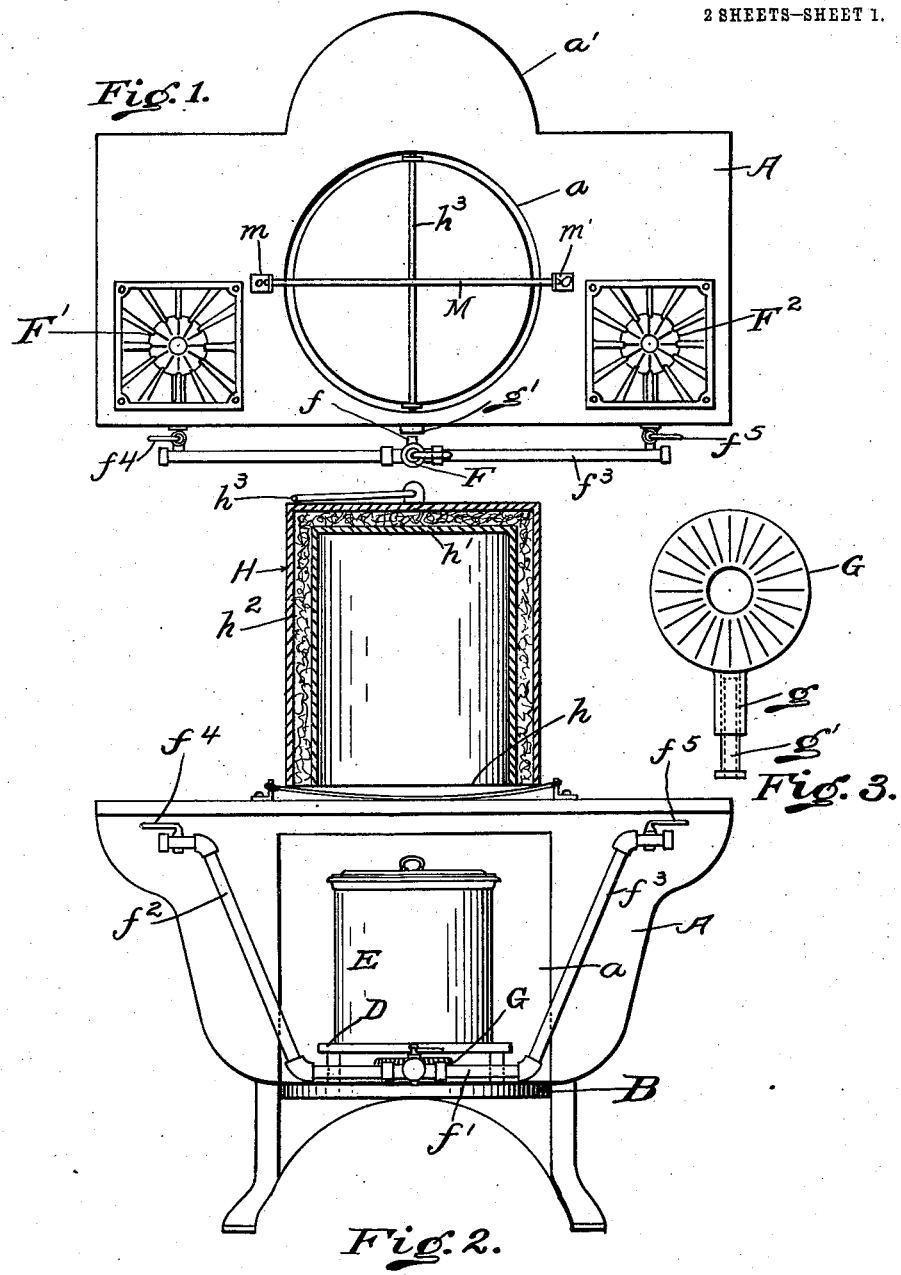

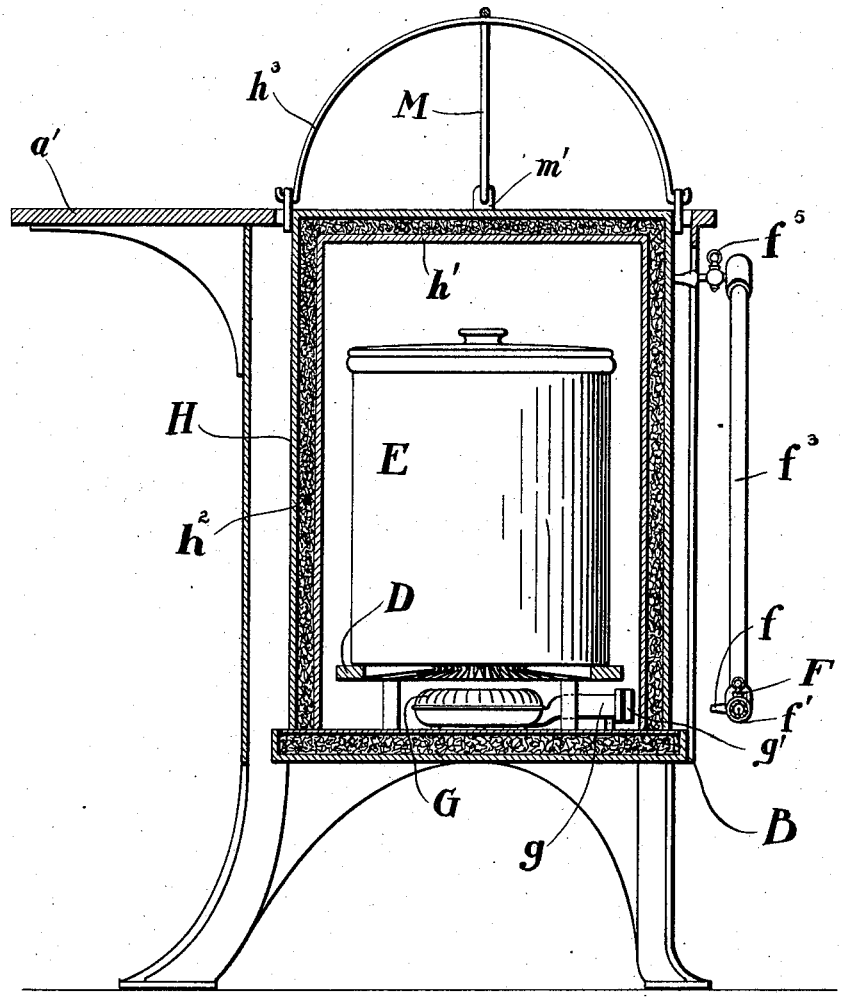

ANTON STREIT AND ALBERT WILLIAM STREIT, OF CINCINNATI, OHIO.

GAS-STOVE.

1,014,421.   Specification of Letters Patent.   Patented Jan. 9, 1912.

Application filed July 19, 1909. Serial No. 508,298.

*To all whom it may concern:*

Be it known that we, ANTON STREIT and ALBERT WILLIAM STREIT, citizens of the United States of America, and residents of Cincinnati, county of Hamilton, State of Ohio, have invented certain new and useful Improvements in Gas-Stoves, of which the following is a specification.

Our invention relates to gas stoves which are provided with a means of heating the food initially, and of completing the cooking thereof by stored heat.

The object of our invention is a stove of this class in which a maximum amount of stored heat is retained within the insulating vessel.

Another object of the invention is an insulating vessel which will permit a minimum amount of heat transmission.

Other features of the invention relate to means for simplifying the movements necessary by one who makes use of the device.

These objects are attained by the means illustrated in the accompanying drawings, in which, Figure 1 is a plan view of a gas stove embodying our invention. Fig. 2 is a front elevation of a gas stove embodying our invention with the movable part of the insulating vessel shown in section above the gas stove in the process of placing it in its operative position. Fig. 3 is a detail plan view of the burner. Fig. 4 is a transverse central sectional view of a gas stove embodying my invention.

Referring to the parts: The frame, A, of the stove, is formed so as to leave a central chamber, $a$, upon the bottom of which is located a circular base, B, which is filled with insulating material, so as to render it a non-conductor of heat. Upon the base, B, is situated a central metallic stand, D, which is adapted to support a cooking vessel, E. Beneath the stand, D, is a burner, G. Burner, G, has a pipe, $g$, into which a second pipe, $g'$, telescopes, so that the pipe, $g'$, may be drawn outward toward the nozzle, $f$, from which gas is ejected when the gas-cock, F, is opened. Gas-cock, F, is located in a pipe, $f'$, which is connected to side pipes, $f^2$, $f^3$, which have branch pipes controlled by cocks, $f^4$, $f^5$, and lead into gas burners, F', F$^2$, which are located upon the sides of the central chamber, $a$.

To fit within the chamber, $a$, is a cylindrical insulating vessel, H, which has an open bottom, $h$, and a closed top, $h'$. Both the sides and the top of the insulating vessel consist of double walls, between which is located an insulating material, $h^2$. The vessel, H, is supplied with a swinging bail, $h^3$. Adjacent to the circular opening made by chamber, $a$, in the top of the stove are brackets, $m$, $m'$, in which a semi-circular bail, M, is pivoted.

The stand, D, the vessel, E, and the length of the pipe, $g$, of the burner, G, are made to fit within the interior of the insulating vessel, or cover, H, when it is set down upon the base, B. The pipe, $g'$, is placed in its retracted position within the pipe, $g$, before the insulating vessel, H, is set down upon the base, B. The top of the frame, A, of the stove is provided with a rear bracket, $a'$, which is adapted to support the insulating cover, H, when it is not in use.

The operation of the device is as follows: The insulating vessel, being raised from its base, and placed upon the support, $a'$, the pipe, $g'$, is drawn toward the nozzle, $f$, in a position such as to give the proper amount of air to the gas ejected, into the pipe, $g'$. The cooking vessel, E, containing water and articles to be cooked is placed upon stand, D, and the gas is ignited. After a partial heating, which varies with the character of the food to be cooked, the gas is turned out, the pipe, $g'$, is pushed inward and the vessel H, is set down upon the base, B; then the handle, $h^3$, is brought to its uppermost position, and handle, M, is swung up over the handle, $h^3$, so as to press the vessel, H, firmly into contact with the base, B. It is seen then that there is a maximum amount of stored heat within the vessel, H, namely, there is the heat stored within the cooking vessel, E, the heat of the stand, D, and of burner, G. The base, B, likewise retains whatever heat it may have gotten by radiation from the burner.

What we claim is:

In a gas stove the combination of an insulated base, a stand located upon the base and adapted to support a cooking vessel, a burner beneath the stand, an extensible gas pipe connected to the burner and adapted to be extended beyond or to be retracted beneath the stand, and an insulating cover consisting of a vessel closed upon all sides but the bottom and adapted to fit down over the stand and the burner and to rest upon the base.

ANTON STREIT.
ALBERT WILLIAM STREIT.

Witnesses:
WALTER I. MURRAY,
AGNES McCORMACK.

Copies of this patent may be obtained for five cents each, by addressing the "Commissioner of Patents, Washington, D. C."